July 19, 1938.  L. H. BROWNE  2,124,183
BEARING SEAL
Filed July 28, 1937
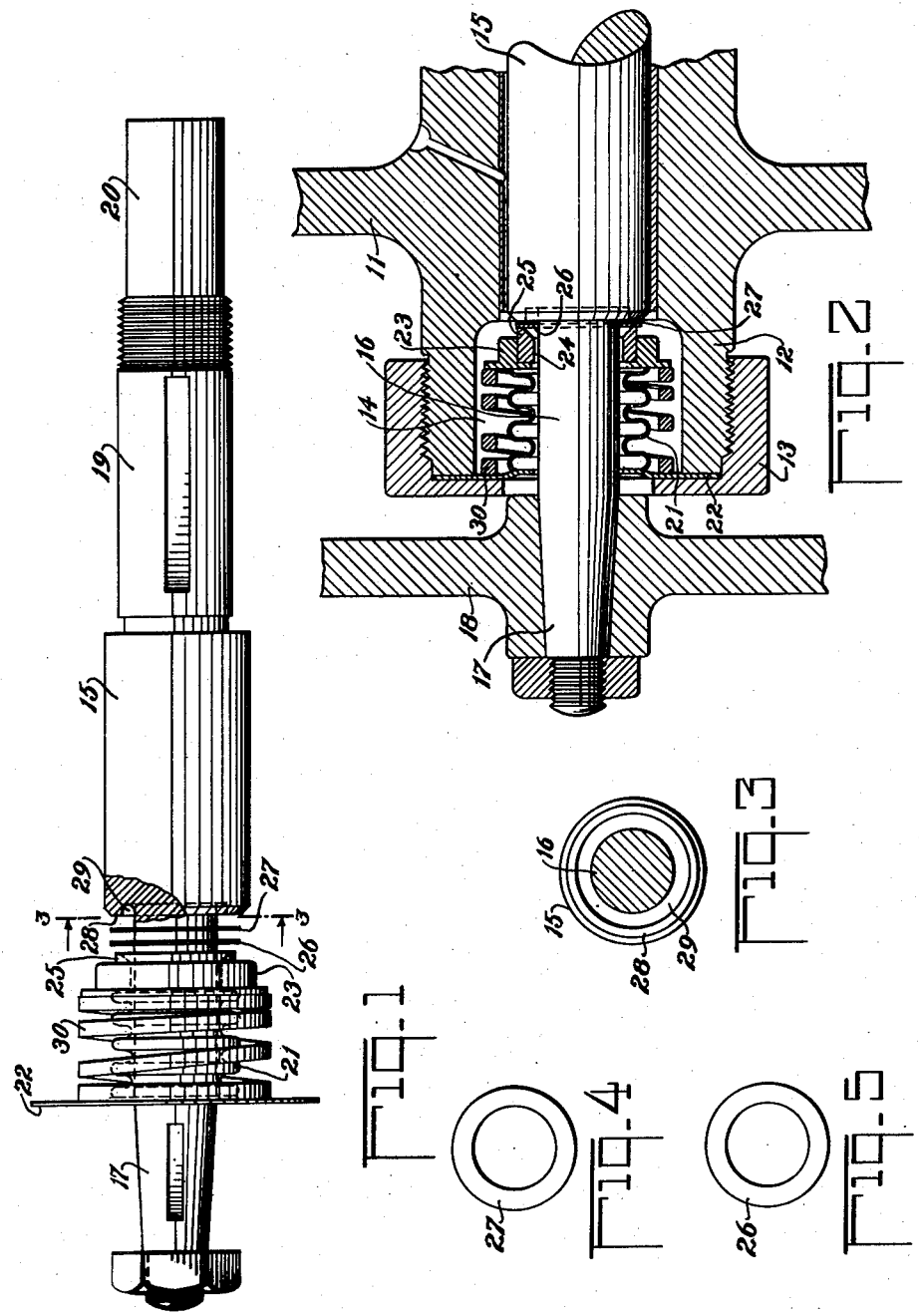
INVENTOR
Lindsay H. Browne.
BY
Van Deventer & Greer
ATTORNEYS Patented July 19, 1938

2,124,183

UNITED STATES PATENT OFFICE 2,124,183

BEARING SEAL

Lindsay H. Browne, Pittsford, N. Y., assignor to Kellogg Compressor and Manufacturing Corporation, a corporation of New York Application July 28, 1937, Serial No. 156,076

3 Claims. (Cl. 286—11)

This invention relates to improvements in bearing seals. An object of this invention is to provide means to increase the efficiency and lower the cost of this type of seal and to facilitate repairs and replacements. The invention is used to seal the outlet of a shaft, and is usually applied to the shaft at the bearing. In air compressors and machines of that type in which there is a difference in pressure between the interior of the housing and the outside of the housing, and the shaft is required to transmit power to the mechanism through the wall of the housing, it is necessary to provide a seal at the outlet of the shaft so as to prevent leakage.

A very common use for this invention is found in the compressors used in electric refrigeration, in which the compressor operates to compress and circulate a refrigerant from the housing of the compressor throughout the system. This refrigerant usually comprises a certain proportion of oil, or the bearing itself may be lubricated, with the result that the seal is applied where it is subjected to saturation by a lubricant and it is necessary to use materials in the seal that do not deteriorate under the action of the lubricant.

More specifically, the invention relates to a seal of the sylphon type which has a yielding bellows controlled by a spring mounted about the outer end of the shaft, and this bellows is provided with a shoe or collar which abuts a corresponding collar formed on or secured to the shaft. In the usual seal construction the engaging surfaces are lapped to form an air-tight seal between the rotating shaft and the stationary head of the bellows.

It is found in ordinary practice that seals of this kind are subject to wear and at times become noisy due to the friction of the engaging parts, and the result is that a leak develops in the seal which ultimately permits the refrigerating gas to escape. They are also comparatively expensive, requiring individual lapping in assembly or replacement.

The present invention improves a seal of this type by the use of a washer which is comparatively thin, but is uniform in thickness, and which is preferably made from a synthetic rubber material such as "Neoprene" which is inert or unaffected by the lubricant from the bearing or the refrigerant itself. This washer is placed against a collar or shoulder on the shaft, and against this resilient washer a comparatively thin flexible steel washer is placed, against which steel washer the ground head or collar of the sylphon seal is forced by the spring of the seal. The steel washer is sufficiently flexible under the tension of the spring to adjust itself to any minute irregularities that may develop in the face of the seal, and the cooperation of the two washers forms an air-tight joint both between the steel washer and the bellows and between both washers and the shaft.

The invention will be more particularly understood from the following specification and the accompanying drawing, in which—

Figure 1 is a plan view of a shaft with the sylphon seal and the washers of the invention separated to illustrate their relation;

Figure 2 is a longitudinal sectional view showing part of the housing and the bearing of the shaft with the sylphon seal and the drive wheel;

Figure 3 is a cross section on the line 3—3 of Figure 1;

Figure 4 is a face view of the synthetic rubber washer; and

Figure 5 is a face view of the steel washer.

In the drawing, 11 is part of the housing of the compressor at the bearing and is provided with a hub 12, having a cap nut 13 which secures the seal in the space 14. The shaft 15 is mounted in the bearing, as shown, and has a reduced section at 16 upon which the seal is mounted, and a tapered end at 17 upon which the drive-wheel 18 is mounted. The opposite end of the shaft (Figure 1) is provided with a section at 19 adapted to carry the operating mechanism, not shown in the drawing, and has an enclosed end journal 20.

The sylphon seal comprises a bellows 21 which is secured to a flange 22 at the outer end, and at the inner end is secured to the flange head 23 in which the seal collar or shoe 24 is mounted. The face of this collar 25 is ground and lapped and engages a flexible steel washer 26 which bears against a resilient washer 27, the washer 27 in turn bearing against the shoulder 28 of the shaft 15. This shoulder may be undercut as indicated at 29 (Figure 1).

After the washers 27 and 26 are in place, the seal assembly is pushed over the shaft and is clamped in place in the hub by the clamp nut 13 engaging the flange 22, as shown in Figure 2. This also compresses the spring 30 between the flange 22 and the head 23, thereby maintaining the engaging faces of the collars 25 and 28, and the washers 26 and 27, in contact under spring pressure. The seal or the washers may be easily replaced by removing the drive-wheel 18 from the shaft and removing the clamp nut 13 which makes the hub space 14 accessible for changing the parts located therein.

Synthetic rubber such as "Neoprene" is preferred for the backing washer 27 because it is highly flexible and is manufactured in extremely uniform thickness and particularly because, unlike natural rubber, and other vegetable materials, it is not materially affected by the lubricant of the bearing—that is, it retains its qualities of resilience and thickness under continued service.

The washer 27 is made a close fit on the shaft 16, and the undercutting of the shoulder 28 at 29 permits any spreading or swelling of the washer 27 to expand in this direction without interfering with the free movement of the metallic washer 26.

The washer or gasket 27 is preferably in the order of $\frac{1}{32}''$ thick, and the flexible steel washer 26 is merely a punching from a standard high polished, high grade Swedish valve steel on the order of .012 inch thick. The above dimensions are for washers up to $1\frac{1}{4}''$ in diameter; for larger diameters, these dimensions would be somewhat increased, for instance in washers up to and including two inches (2''), the preferable thickness of the steel washer is .020 inch; and over two inches (2''), a thickness of $\frac{1}{32}''$ may be used. The thickness of the metal washer should be such with relation to the spring tension of the bellows that it will yield to the pressure of this tension against the support of the backing washer 27 to the degree necessary to follow the minute irregularities of the active face 25 of the seal collar.

Since the face 28 of the shaft collar or shoulder bears against the resilient washer 27, it is not necessary to grind this face. This simplifies the shaft construction and avoids special hardening of the collar 28 and reduces the cost of manufacture. The metal washer is made from commercial stock without grinding and is, therefore, comparatively inexpensive. The invention resides principally in the use of a thin flexible metallic sealing washer backed by a yieldable gasket and responsive to variations in the engaging surface of the seal head as the washer is rotated. Obviously, the same sealing combination may be used wherein the sylphon assembly revolves with the shaft and the sealing washers are supported against a stationary shoulder of the casing.

The invention may be applied to seals of many different types in which spring pressure is used to maintain the contacting surfaces in the sealed position.

While the invention has been described in preferred form, it is not limited to the precise structures illustrated, as various modifications may be made without departing from the scope of the appended claims.

What is claimed is:

1. A bearing seal comprising a shaft provided with a shoulder having an annular seal bearing surface formed by a peripheral chamfer portion and an inner annular undercut portion formed thereon, a housing having a hub and a bearing for said shaft, a seal for said shaft including a packing washer of synthetic rubber placed against said annular surface, a yieldable metallic washer placed against said first washer, a bellows member in said hub having a collar engaging said metallic washer, means for applying pressure to said collar to hold said washers and shaft in engagements whereby the inner and outer peripheral edges of the rubber washer may freely expand to permit uniform distribution of the packing material over the annular bearing surface, and means for clamping said sylphon bellows in said hub.

2. A seal for a shaft bearing comprising a housing for the bearing and seal, a shoulder on said shaft provided with an annular seal bearing surface formed by a peripheral chamfer portion and an inner annular undercut portion, a freely mounted packing washer of synthetic rubber located on said shaft, a sylphon bellows seal member secured to said housing and adapted to compress said washer against the shoulder of said shaft, and a relatively thin freely mounted flexible metallic washer between said first washer and said sylphon seal.

3. In a shaft seal, in combination, an axially fixed member having a shoulder provided with an annular seal bearing surface formed by an outer annular chamfer and an inner annular undercut portion, an axially movable annular shoe, a resilient non-metallic washer against said annular seal bearing surface of said shoulder, a flexible metallic washer against said non-metallic washer, and means to urge said annular shoe into rotary sealing relation with said metallic washer whereby the inner and outer peripheral edges of the non-metallic washer shall be free to permit uniform displacement of said washer over said bearing surface.

LINDSAY H. BROWNE.